(12) United States Patent
Morita

(10) Patent No.: US 6,778,711 B2
(45) Date of Patent: Aug. 17, 2004

(54) RECORDING MEDIUM IN WHICH IMAGE DATA CONFORMING TO IMAGE OUTPUT DEVICES ARE STORED

(75) Inventor: Toru Morita, Tokyo (JP)

(73) Assignee: Sony Computer Entertainment Inc. (JP)

(*) Notice: Subject to any disclaimer, the term of this patent is extended or adjusted under 35 U.S.C. 154(b) by 610 days.

(21) Appl. No.: 09/792,308

(22) Filed: Feb. 23, 2001

(65) Prior Publication Data

US 2001/0026647 A1 Oct. 4, 2001

(30) Foreign Application Priority Data

Feb. 25, 2000 (JP) .......................................... 2000-049922
Feb. 20, 2001 (JP) .......................................... 2001-042973

(51) Int. Cl.[7] .......................... G06K 9/32; A63F 13/00; G09G 5/00
(52) U.S. Cl. .......................... 382/299; 463/43; 345/660
(58) Field of Search .............................. 382/254, 299, 382/300, 305; 463/1, 44, 43, 31; 345/581, 660, 700; 348/563, 333.05, 344, 325

(56) References Cited

U.S. PATENT DOCUMENTS

| | | | | |
|---|---|---|---|---|
| 5,266,933 A | * | 11/1993 | Frank et al. | 345/467 |
| 5,926,166 A | * | 7/1999 | Khederzadeh et al. | 345/581 |
| 6,028,585 A | * | 2/2000 | Ishii et al. | 345/581 |
| 6,135,884 A | * | 10/2000 | Hedrick et al. | 463/20 |
| 6,313,877 B1 | * | 11/2001 | Anderson | 348/333.05 |
| 6,315,666 B1 | * | 11/2001 | Mastera et al. | 463/31 |
| 6,373,462 B1 | * | 4/2002 | Pan et al. | 345/600 |
| 6,428,415 B1 | * | 8/2002 | Ohba et al. | 463/31 |
| 6,435,969 B1 | * | 8/2002 | Tanaka et al. | 463/44 |
| 6,587,154 B1 | * | 7/2003 | Anderson et al. | 348/553 |

* cited by examiner

*Primary Examiner*—Kanji Patel
(74) *Attorney, Agent, or Firm*—Lerner, David, Littenberg, Krumholz & Mentlik, LLP

(57) ABSTRACT

Image data 110 of an object is recorded in a recording medium so as to contain data 113 for a high resolution and data 112 for a low resolution. In executing a game, an image display device is discriminated, and image data conforming to the resolution of the image display device is used. Thus, an object appearing in the game is displayed using the image data suited to the image display device.

14 Claims, 14 Drawing Sheets

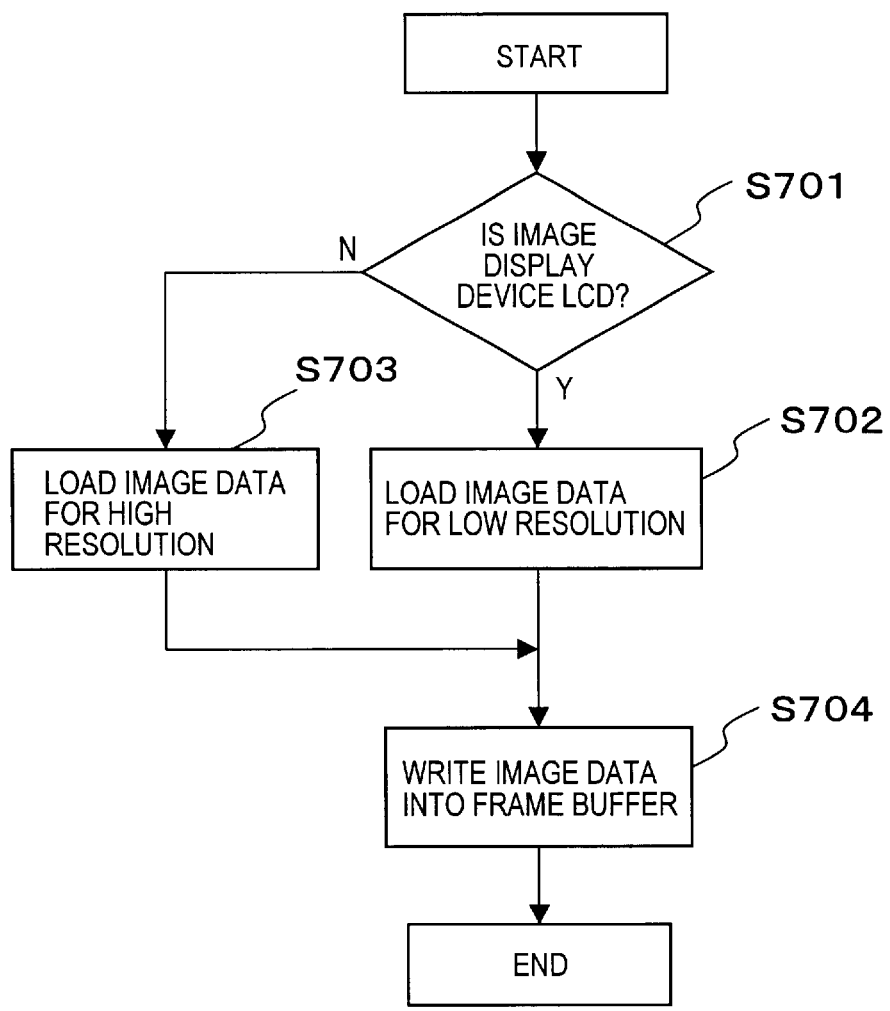

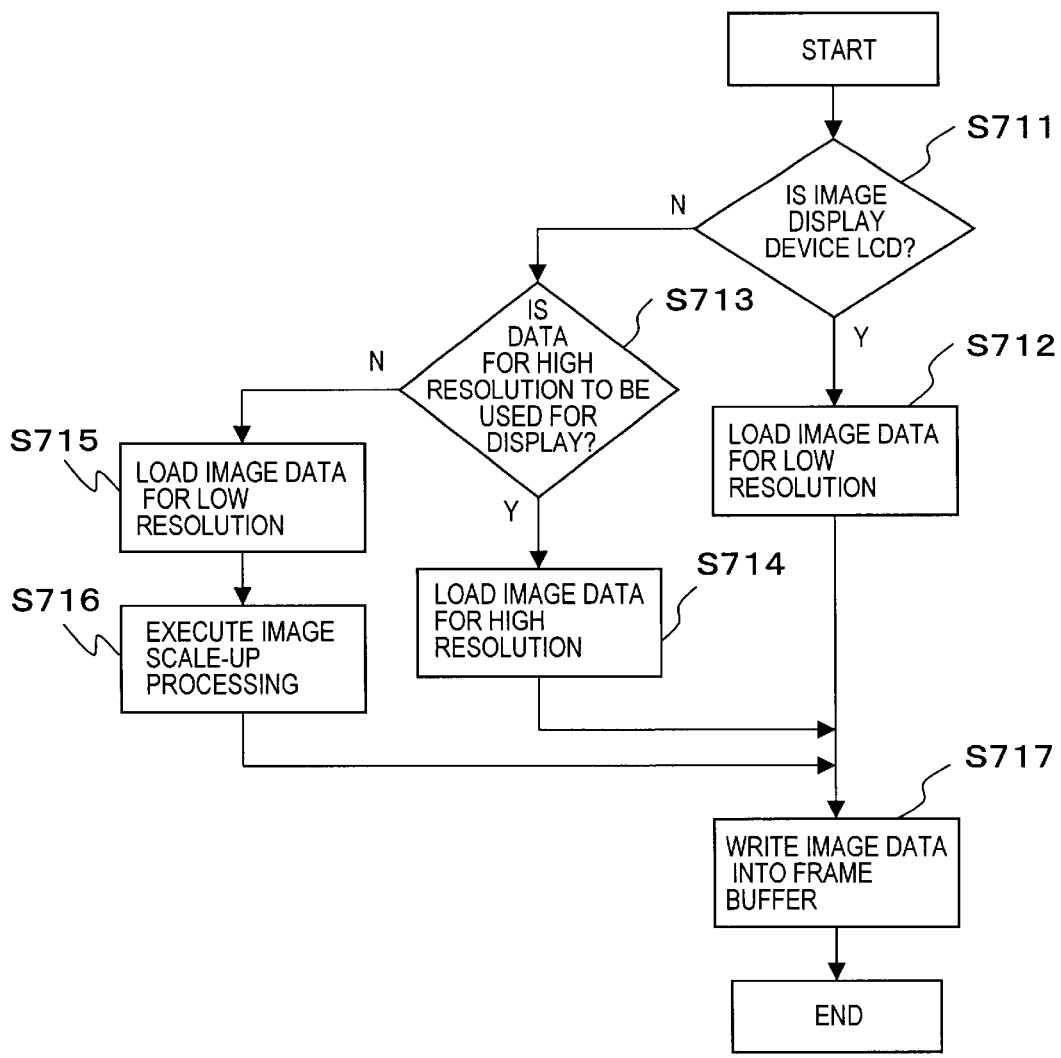

RECORDING MEDIUM IN WHICH IMAGE DATA CONFORMING TO IMAGE OUTPUT DEVICES ARE STORED

This application claims a priority based on Japanese Patent Application No. 2000-49922 filed on Feb. 25, 2000, and 2001-42973 filed on Feb. 20, 2001 the entire contents of which are incorporated herein by reference for all purposes.

BACKGROUND OF THE INVENTION

The present invention relates to image display means in game machines.

In general, a casing of a portable game machine is provided with a liquid crystal display device as an image display device. Since importance is attached to portability for the portable game machine, the size of the casing has a certain limitation. Therefore, a large-sized liquid crystal display device cannot be employed, which makes it difficult to heighten the resolution of the display screen of the liquid crystal display device of the portable game machine.

A game program of the portable game machine is often distributed with a semiconductor device, such as a memory card or a memory cartridge, as a medium. In such a game program, image data are created in conformity with the resolution of the display screen of the liquid crystal display device included in the portable game machine.

Meanwhile, it has been considered in recently years to furnish the portable game machine with a terminal for outputting image data (external video output terminal) and to display the image of the portable game machine on the screen of a TV set or the like. Besides, it has been considered that the memory card or the like of the portable game machine is made usable also by a stationary game machine in order that the game program for the portable game machine may be enjoyed by the stationary game machine which can provide a user with superior operation feeling at his home.

On the other hand, it has been considered owing to enhancement in the processability of the portable game machine that a game program for the stationary game machine is made divertible to and usable by the portable game machine. This makes it possible, for example, to consecutively play a game for the stationary game machine by the portable game machine even when a user is out.

The resolution of the liquid crystal display device included in the portable game machine is usually lower as compared with that of the TV set to be connected to the stationary game machine. Therefore, when the image data are created in conformity with the resolution of the liquid crystal display device of the portable game machine, a display roughens on the screen of the TV set. On the other hand, when image data are created in conformity with the resolution of the TV set, alphanumeric information etc. are displayed in distorted states on the screen of the liquid crystal display device of the portable game machine.

Proposed as a technique for solving the former problem is a method wherein an original image is scaled up by processing such as interpolation, thereby to heighten an apparent resolution. Proposed as a technique for solving the latter problem is a method wherein an original image is scaled down by processing such as of a low-pass filtering.

SUMMARY OF THE INVENTION

As shown in FIG. 9A by way of example, the pictorial frame of a game contains objects having various properties, such as a character 810, a background 811 and alphanumeric information 812. In this regard, an image displayed on a display device is a result obtained in such a way that the image data of the respective objects as shown in FIG. 9B are overlapped by a graphic processing unit included in a game machine.

A technique for scaling up or down the image is such that the frame being the result of the overlap of the objects as shown in FIG. 9A is uniformly submitted to image processing. In the case of uniformly scaling up the image of the overlapped result, the display thereof is smoothened as a whole, but it cannot express, for example, the facial expression of the character not contained in the original image data. Therefore, the display by a TV set becomes unsatisfactory. On the other hand, in the case of uniformly scaling down the image, as the processing is executed irrespective of the contents of the alphanumeric information and the character, it might result in thinning out any important part of the character or containing an in-between color at the display part of the alphanumeric information. There is the possiblity that the character or the alphanumeric information will become illegible.

An object of the present invention is to provide a technique by which objects appearing in a game are displayed using image data suited to image display devices.

In order to accomplish the object, according to the present invention, the image data of objects are created for, at least, a high resolution and a low resolution, and they are recorded in a recording medium. A game machine having loaded the image data of the recording medium judges whether an image display device is one of low resolution or one of high resolution. Thus, it displays the objects by using the image data which conform to the resolution of the display device.

On this occasion, it is sometimes difficult in view of the limited storage capacity of a memory card or the like, the cost of data creation, etc. that, as to all the objects, the image data are recorded for the plurality of resolutions beforehand. Besides, even when the objects, for example, such as backgrounds have had their displays somewhat disordered by undergoing the image processing of scale-up or -down, they are less influential than the objects of alphanumeric information, characters, etc. Therefore, information which indicates whether the image data are created for the plurality of resolutions or the image of the object is scaled up or down by the image processing may well be affixed every object beforehand, so as to display the object by the method suited to the property thereof.

BRIEF DESCRIPTION OF THE DRAWINGS

FIG. 5 is a flow chart for explaining an example of the image processing of the portable game machine;

FIG. 6 is a flow chart for explaining another example of the image processing of the portable game machine;

PREFERRED EMBODIMENTS OF THE INVENTION

The aspect of embodiment of the invention will be described with reference to the drawings.

In the ensuing aspect of embodiment, there will be described a case where the invention is applied to a portable game machine and a stationary game machine. Incidentally, the present invention is not restricted to the game machines, but it is extensively applicable to information processors such as entertainment systems and computers.

Figure 10:
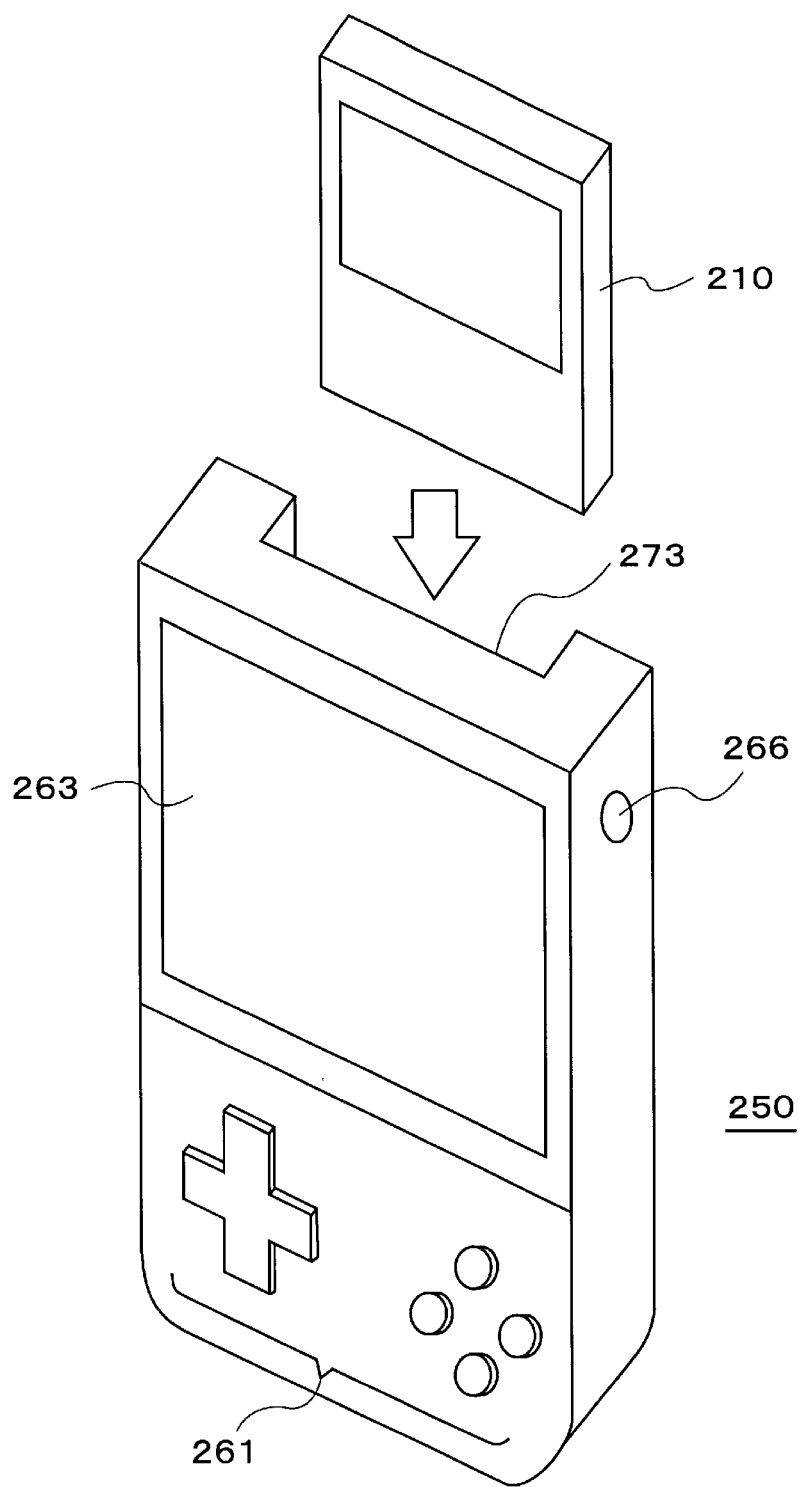
FIG. 10 is a perspective view showing an example of the external appearance of the portable game machine as well as a memory card.

First, the portable game machine employed in the ensuing aspect of embodiment will be briefly explained. FIG. 10 is a perspective view showing an example of the external appearance of the portable game machine as well as a memory card which is a game program supplying medium. As shown in the figure, the portable game machine 250 is miniaturized so as to be handy, and it has a configuration and a layout in which it can be held with both hands and operated with fingers during use. Information items from the portable game machine 250 to its user are given by an image and speech. Since a game program to be executed by the portable game machine 250 is supplied from the memory card 210, the single portable game machine 250 can offer various games to the user by changing such memory cards 210.

The memory card 210 has a built-in semiconductor device, and the single memory card usually stores one game program therein. When the user of the portable game machine 250 wants to play any game with this machine 250, he/she purchases the memory card 210 in which the program of the game is stored.

The portable game machine 250 is furnished with a liquid crystal display device 263 and operating buttons 261 at the front of the casing thereof. Thus, the portable game machine 250 receives the user's instructions through the operating buttons 261. Also, it displays visual information to the user through the liquid crystal display device 263. The resolution of the liquid crystal display device 263 is usually 160×144 dots or so. Besides, it provides speech information to the user through an acoustic device (loudspeaker) 264 (shown in FIG. 11). An external video output terminal 266 for outputting image data to a home-use TV set is disposed at the side of the portable game machine 250. The external video output terminal 266 is in a shape in which a cable having a pin jack, for example, can be inserted thereinto.

In use, the memory card 210 is inserted into a setting port 273 provided at the top of the portable game machine 250, in the direction of an arrow. When the memory card 210 has been set in the portable game machine 250, the game program stored in the memory card 210 is read out by the portable game machine 250. Thus, the portable game machine 250 executes the game in accordance with the loaded game program. In this aspect of performance, not only a memory card developed for a portable game machine, but also a memory card developed for a stationary game machine can be inserted into the setting port 273 so as to load a game program.

Figure 11:
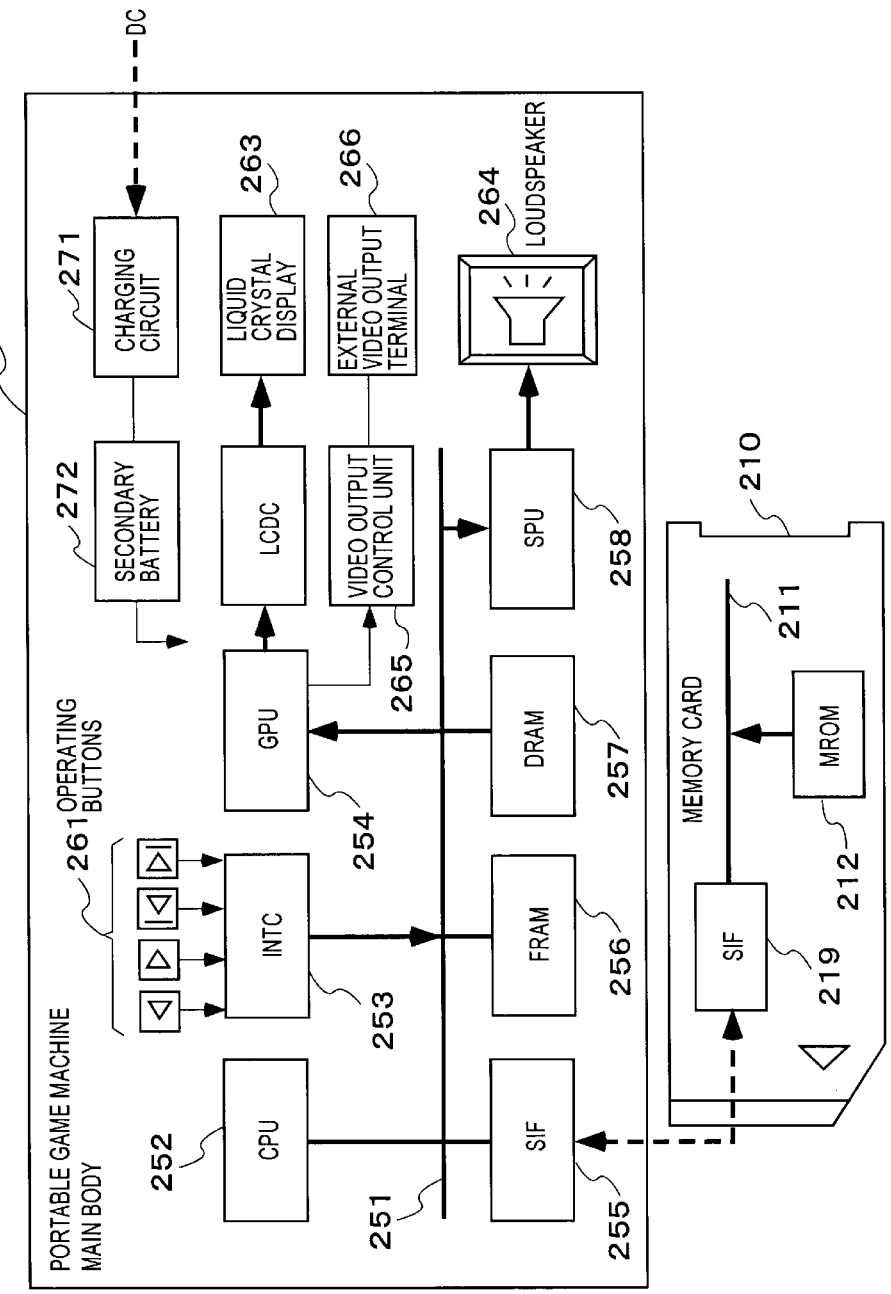
FIG. 11 is a block diagram showing an example of the internal construction of the portable game machine.

FIG. 11 is a block diagram showing an example of the internal construction of the portable game machine 250. This portable game machine 250 is a game machine of portable type which loads the game program from the memory card 210 so as to run it, and in which a central processing unit (CPU) 252, an interrupt control unit (INTC) 253, a graphic processing unit (GPU) 254, a serial interface (SIF) 255, a frame buffer (FRAM) 256, a dynamic memory (DRAM) 257 and a sound processing unit (SPU) 258 are connected to an internal bus 251.

The game program loaded from the memory card 210 is temporarily stored in the dynamic memory 257. The central processing unit 252 performs various processes in accordance with the game program.

The operating buttons 261 disposed on the outer side of the portable game machine 250 are connected to the interrupt control unit 253. When the operating button 261 is depressed, information indicative of the depression is transmitted to the central processing unit 252 through the interrupt control unit 253 and the bus 251. The progress of the program, for example, is controlled on the basis of the information.

The liquid crystal display device 263 is connected to the graphic processing unit 254 through a liquid crystal display control unit (LCDC) 262. Besides, the external video output terminal 266 for outputting an image to the home-use TV set is connected through a video output control unit 265. The graphic processing unit 254 gives the central processing unit 252 information which indicates if the cable is connected to the video output terminal 266. Also, the graphic processing unit 254 outputs image data to the TV set through the video output terminal 266 in a case where the cable is connected to this video output terminal 266. On the other hand, it outputs image data to the liquid crystal display device 263 in a case where the cable is not connected to the video output terminal 266.

The central processing unit 252 includes various registers therein. In this aspect of embodiment, a specified one of registers shall be employed as a register into which image display device information is written. The image display device information serves to discriminate whether the image display device for outputting the image data is the liquid crystal display device 263 or the TV set, and it is written into the specified register. Upon receiving from the graphic processing unit 254 the information to the effect that the cable is not connected to the video output terminal 266, the central processing unit 252 writes information expressive of the "liquid crystal display device" (for example, "0") into the register as the image display device information. On the other hand, upon receiving from the graphic processing unit 254 the information to the effect that the cable is connected to the video output terminal 266, the central processing unit 252 writes information expressive of the "TV set" (for example, "1") into the register as the image display device information. Incidentally, the image display device information need not always be written into the register of the central processing unit 252, but it may well be written into, for example, the dynamic memory 257.

A charging circuit 271 and a secondary battery 272 are disposed in the portable game machine 250. When direct current is fed from an unshown power source device to the charging circuit 271, power is fed to the built-in units of the central processing unit 252, etc. through the secondary battery 272.

Figure 12:
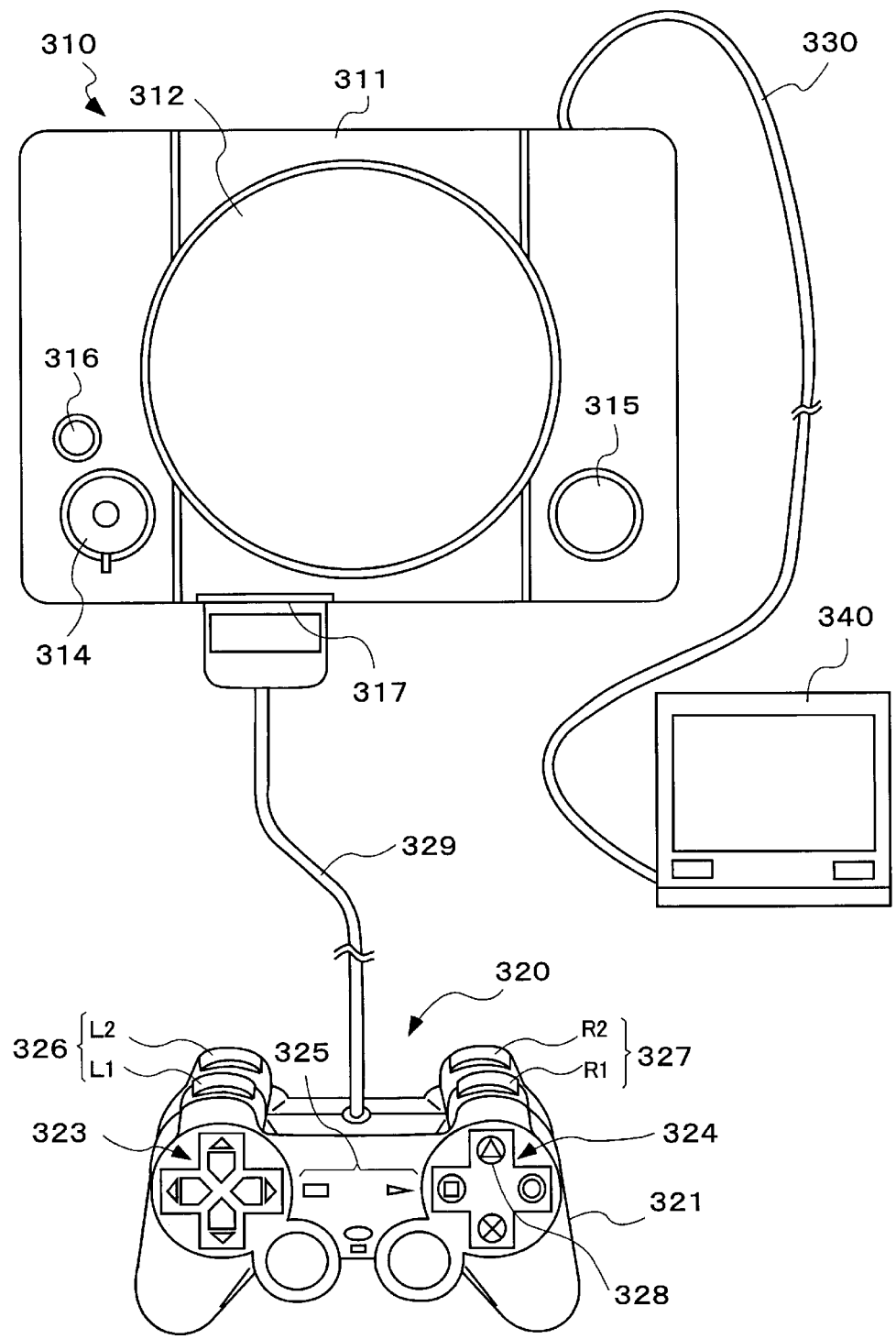
FIG. 12 is a view mainly showing an example of the external appearance of the top of the stationary game machine.
Figure 13:
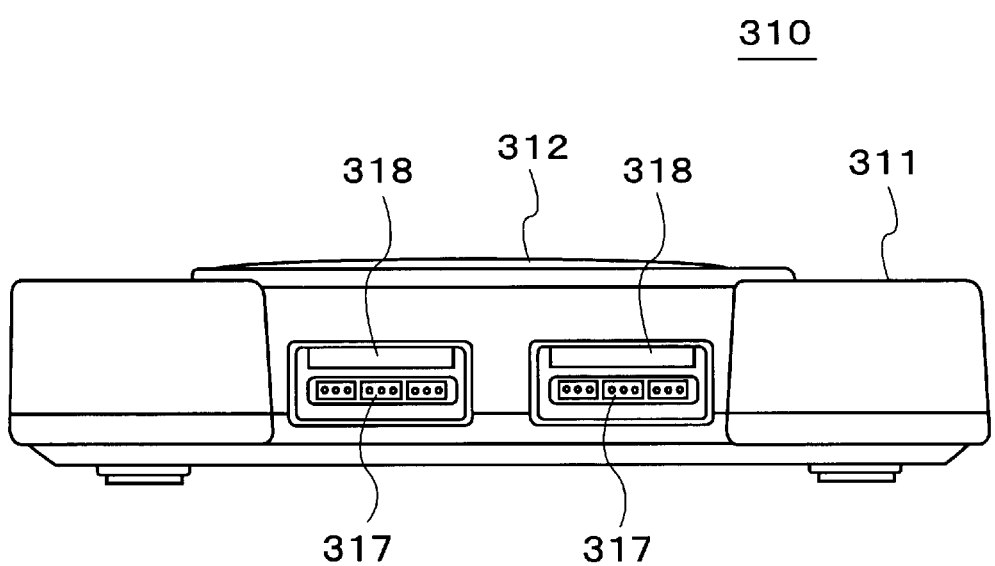
FIG. 13 is a view mainly showing an example of the external appearance of the front of the stationary game machine.

Next, the stationary game machine will be briefly explained. FIG. 12 is a view mainly showing an example of the external appearance of the top of the stationary game machine, while FIG. 13 is a view mainly showing an example of the external appearance of the front of the stationary game machine. The stationary game machine 310 is constructed of a casing 311, and portions provided in the casing 311. A portion in which an optical disk (CD-ROM) for supplying a game program is set, is provided centrally of the top of the casing 311, and it is shielded with a CD cover 312. Incidentally, a medium for supplying the program is not restricted to the optical disk, but the program may well be supplied from a semiconductor device or through a communication line.

A power source switch 314, a cover operating switch 315 and a reset switch 316 are arranged at the top of the casing 311, in addition to the CD cover 312. Connectors 317 and a memory card slot 318 are arranged at the front side of the casing 311. A controller 320 is connected to the connectors 317 by a dedicated cable 329. A plurality of such connectors 317 is disposed, and the controllers 320 can be respectively connected to the connectors 317. A memory card having a built-in semiconductor device can be inserted into the memory card slot 318. The memory card is classified into an external storage device, a program supplying medium, etc. In this aspect of embodiment, not only a memory card developed for a stationary game machine, but also a memory card developed for a portable game machine can be inserted into the memory card slot 318 so as to load a game program.

An external connection terminal is disposed at the back side of the casing 311. The external connection terminal is connected with the monitor equipment 340 of a TV set or the like being a video/audio device, through a predetermined cable 330.

The controller 320 is constructed having a casing 321 which serves also as a grip portion, and groups of buttons 323–327 which are disposed at the right and left positions and middle position of the top of the casing 321 and at the right and left positions of the front thereof.

In the group of buttons 323 at the left position of the top of the casing 321, four buttons respectively corresponding to upper, lower, right and left arrows are arranged crosswise. In the group of buttons 324 disposed at the right position of the top, four buttons respectively bearing marks Δ, ○, × and □ are arranged crosswise. The group of buttons 325 at the middle position of the top include a button for instructing the start of a game, and a plurality of buttons for instructing the stop and pause of the game.

The group of buttons 326 disposed at the left position of the front of the casing 321 consist of two buttons L1 and L2, while the group of buttons 327 disposed at the right position consist of two buttons R1 and R2. The buttons L1–R2 are located so that they can be operated principally with the first fingers and middle fingers of left and right hands when the player of the game has grasped the casing 321 with both the hands.

Subject to the program supplying medium being the optical disk, in executing the game program, the player depresses the CD cover operating switch 315 of the stationary game machine 310 so as to open the CD cover 312, and he/she sets the optical disk storing the game program therein, at a predetermined position. After closing the CD cover 312, he/she depresses the power source switch 314 so as to start the stationary game machine 310. Then, the program stored in the optical disk is loaded into the stationary game machine 310. Thus, the stationary game machine 310 starts the game in accordance with the loaded program. On the other hand, subject to the program supplying medium being the memory card, the player inserts the memory card into the memory card slot 318 and starts the stationary game machine 310. Information items from the stationary game machine 310 are given by an image and speech outputted from the monitor equipment 340 connected outside. Besides, the player's instructions are inputted through the operations of the buttons of the controller 320.

Figure 14:
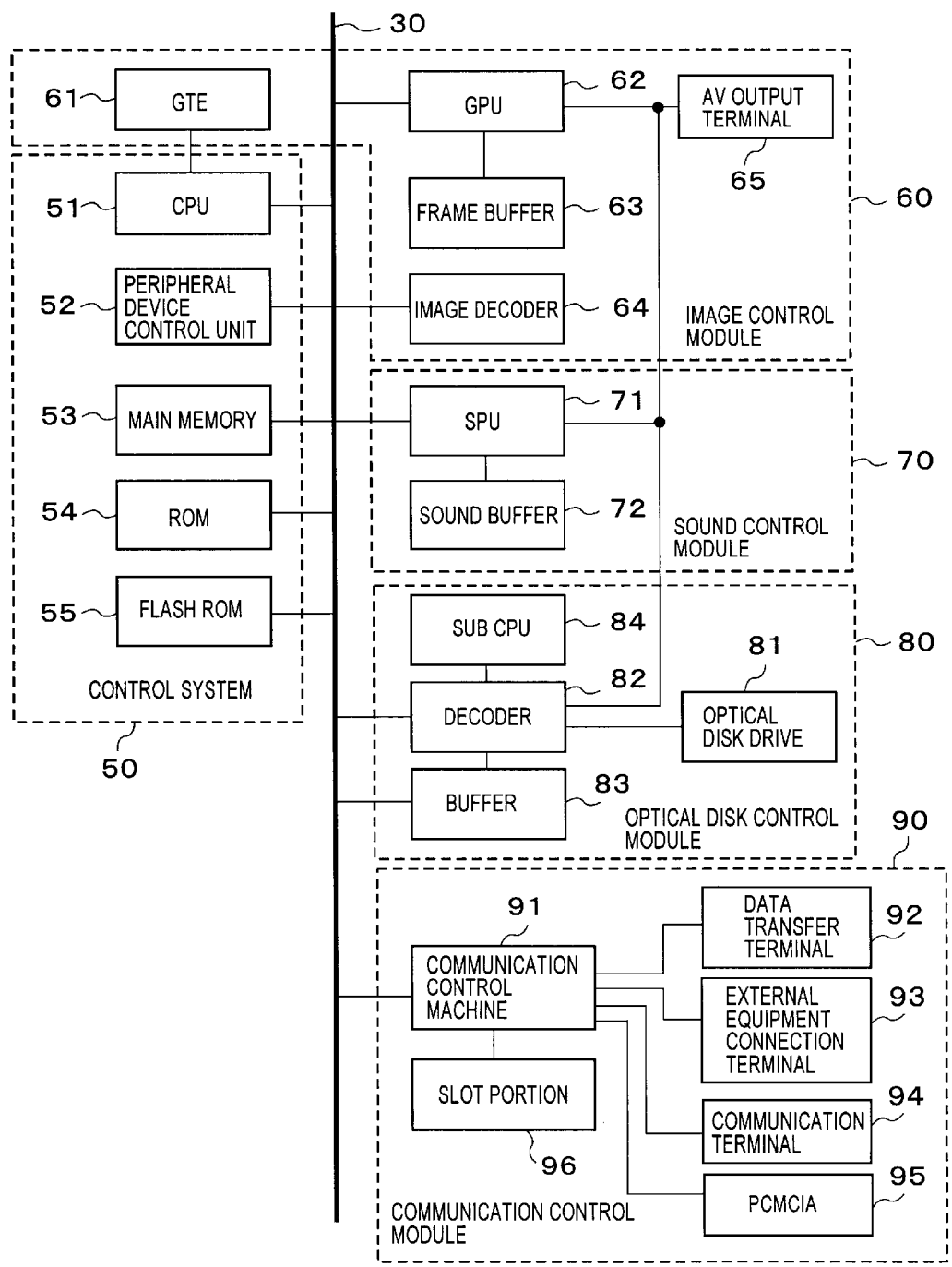
FIG. 14 is a block diagram showing an example of the internal construction of the stationary game machine.

FIG. 14 is a block diagram showing an example of the internal construction of the stationary game machine 310. This stationary game machine 310 is constructed having a control system 50 which is configured of a central processing unit (CPU) 51 and the peripheral devices thereof, an image control module 60 which is configured of a graphic processing unit (GPU) 62 and the peripheral devices thereof, a sound control module 70 which is configured of a sound processing unit (SPU) 71 and so forth, an optical disk control module 80, and a communication control module 90.

The control system 50 includes the central processing unit 51, a peripheral device control unit 52 which controls, for example, intstructions through the controller 320, a main memory 53 into which the program stored in the external storage device is loaded, a read only memory (ROM) 54 in which a management program for the whole machine is stored, and so forth.

The image control module 60 includes the graphic processing unit 62 which executes graphic processing computations, etc. on the basis of commands from the central processing unit 51, a frame buffer 63 in which image data are temporarily written, and so forth. Herein, a generated image is displayed by the TV set connected to an output terminal 65. The resolution of the TV set is usually on the order of 640×240 dots.

The sound control module 70 includes the speech processing unit 71 which generates speech, sound effects, etc. on the basis of commands from the central processing unit 51, and a sound buffer 72 in which waveform data, etc. are recorded by the sound processing unit 71. Herein, the speech, sound effects, etc. generated by the speech processing unit 71 are outputted from an acoustic device (loudspeaker) connected to the external connection terminal of the stationary game machine 310. Further, information items based on the states of the buttons of the controller 320 connected to the connector 317 are detected by the communication control module 90. Then, the communication control module 90 transmits the information items to the central processing unit 51. Thus, the central processing unit 51 executes processes corresponding to the button information, on the basis of the program.

The embodiments of the present invention will be described by exemplifying the portable game machine 250 and the stationary game machine 310 of the above-described constructions.

The first embodiment of the invention will be described on a case of applying the present invention to a recording medium (memory card) in which a game program for a portable game machine is stored, and to the portable game machine 250. Supposed as the case is one where the recording medium storing therein the game program developed for the portable game machine is used in the portable game machine 250. Since the recording medium is for the portable game machine, image data for a low resolution are basically stored therein.

First, there will be explained a method wherein image data are created as to all objects for the resolution of the liquid crystal display device 263 (for the low resolution) and for the resolution of the TV set (for a high resolution). FIG. 5 is a flow chart for explaining a process on this occasion. By the way, although the liquid crystal display device 263 and the TV set will be respectively explained below as having the low resolution and the high resolution, the display devices and the resolutions are mere examples, and they are not restrictive. The image data to be created are not restricted to the two sorts of data for the high resolution and for the low resolution, either.

Figure 1:
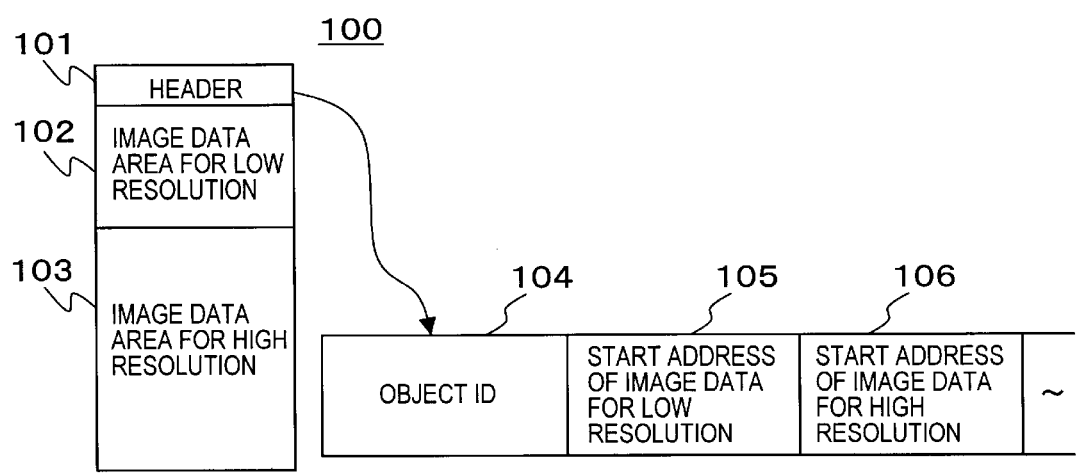
FIG. 1 is a diagram showing an image data structure for a portable game machine in the case where image data for a low resolution and for a high resolution are created as to all objects.

FIG. 1 is a diagram schematically showing the image data structure of an object recorded in the recording medium which stores the game program therein. As shown in the figure, the image data 100 of the object contains a header part 101, an image data area for a low resolution 102 and an image data area for a high resolution 103.

The header part 101 of the image data 100 of the object bears as its records an object ID 104, etc., and besides, the start address 105 of image data for the low resolution adapted to the resolution of the liquid crystal display device 263, as well as the start address 106 of image data for the high resolution adapted to the resolution of the TV set.

The graphic processing unit 254 which has been requested to display the image of the object by the central processing unit 252 of the portable game machine 250, checks if an image display device is the liquid crystal display device 263, by referring to the image display device information written in the register (S701).

In a case where the image display device is the liquid crystal display device 263, the graphic processing unit 254 loads the image data for the low resolution 102 by referring to the "start address of the image data for the low resolution" 105 at the header part 101 of the image data 100 of the object (S702). Subsequently, the unit 254 writes the image data for the low resolution 102 into the frame buffer 256 (S704). Thereafter, the unit 254 executes processing, such as lapping the object image over the image of any other object, and it displays the resulting image on the liquid crystal display device 263.

On the other hand, in a case where the image display device is the TV set, the graphic processing unit 254 loads the image data for the high resolution 103 by referring to the "start address of the image data for the high resolution" 106 at the header part 101 of the image data 100 of the object (S703). Subsequently, the unit 254 writes the image data for the high resolution 103 into the frame buffer 256 (S704). Thereafter, the unit 254 executes processing, such as lapping the object image over the image of any other object, and it outputs the resulting image to the video output terminal 266 so as to display this image by the TV set.

Next, there will be explained a method wherein information which indicates whether image data for the high resolution is used or an object image is scaled up by image processing, in case of presenting a display by the TV set, is affixed every object. FIG. 6 is a flow chart for explaining a process on this occasion.

Figure 2A:
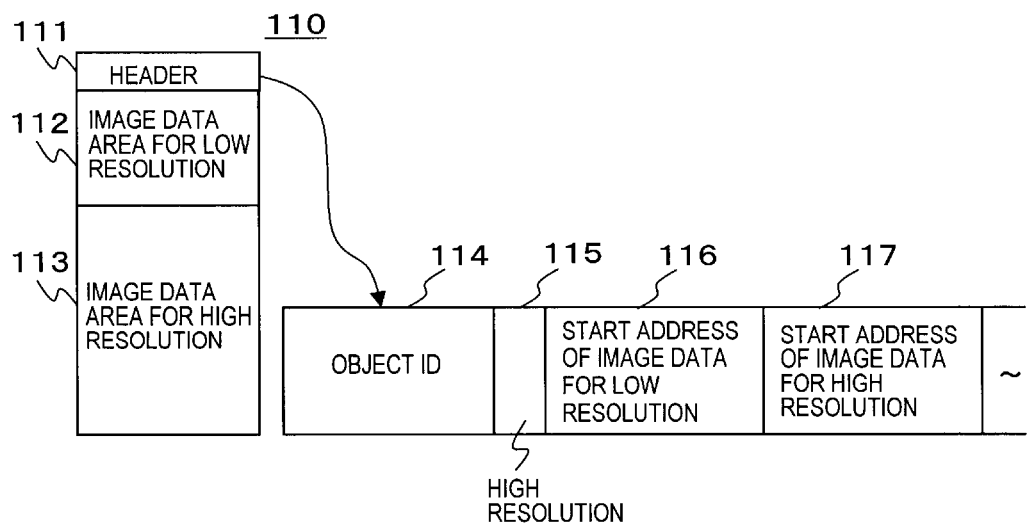
FIGS. 2A and 2B are diagrams each showing an image data structure for the portable game machine in the case where a display method is designated every object.
Figure 2B:
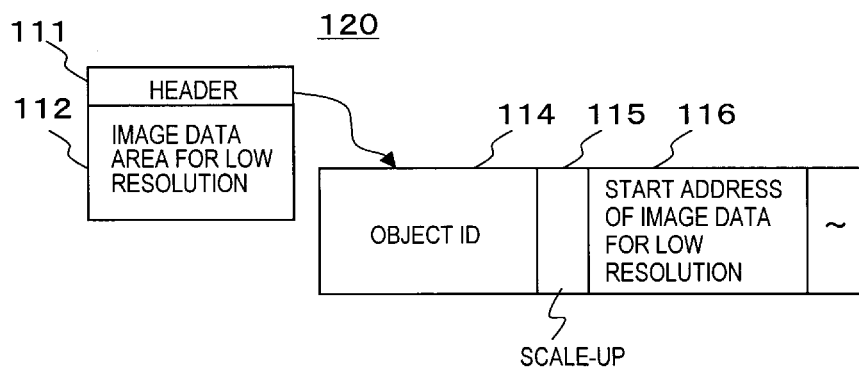

FIGS. 2A and 2B are diagrams schematically showing the image data structures of objects recorded in the recording medium which stores the game program therein, respectively. As shown in the figures, the image data of the objects are of two kinds of data 110 in FIG. 2A and 120 in FIG. 2B.

The header part 111 of the image data 110 or 120 of the object bears as its records an object ID 114, the start address 116 of image data for the low resolution adapted to the resolution of the liquid crystal display device 263, etc., and a flag 115 for discriminating whether the image data for the high resolution 113 is to be used or the image data for the low resolution 112 is to be scaled up, in case of displaying the object by the TV set. Thus, in a case (FIG. 2A) where the flag 115 indicates the object which is displayed using the image data for the high resolution 113, the start address 117 of this image data for the high resolution is recorded in the header part 111. On the other hand, in a case (FIG. 2B) where the flag 115 indicates the object which is displayed by scaling up the image data for the low resolution 112, the start address 117 is not recorded in the header part 111.

The image data area for the low resolution 112 is provided behind the header part 111 of each of the image data 110 and 120 of the object. In the case where the flag 115 indicates the object which is displayed using the image data for the high resolution, the image data 110 is further provided with the image data area for the high resolution 113. On the other hand, in the case where the flag 115 indicates the object which is displayed by scaling up the image data for the low resolution, the above area 113 is not provided. Therefore, the quantity of image data can be decreased.

According to this method, it is desirable to create the high resolution image data for the object which is alphanumeric information, a character or the like, and to endow a background or the like with the format of the data which is scaled up for the display by the image processing.

The graphic processing unit 254 which has been requested to display the image of the object by the central processing unit 252 of the portable game machine 250, checks if an image display device is the liquid crystal display device 263, by referring to the image display device information written in the register (S711).

In a case where the image display device is the liquid crystal display device 263, the graphic processing unit 254 loads the image data for the low resolution 112 by referring to the start address of the image data for the low resolution 116 at the header part 111 of the image data 110 or 120 of the object (S712). Subsequently, the unit 254 writes the image data for the low resolution 112 into the frame buffer 256 (S717). Thereafter, the unit 254 executes processing, such as lapping the object image over the image of any other object, and it displays the resulting image on the liquid crystal display device 263.

On the other hand, in a case where the image display device is the TV set, the graphic processing unit 254 acquires information which indicates whether the image data for the high resolution 113 is to be used for the display or the image data for the low resolution 112 is to be scaled up for the display by the image processing, by referring to the flag 115 of the header part 111 of the image data 110 or 120 of the object (S713). In a case where the object is displayed using the image data for the high resolution 113, the unit 254 loads the image data for the high resolution 113 by referring to the start address 117 of this image data for the high resolution at the header part 111 of the image data 110 of the object (S714). Subsequently, the unit 254 writes the image data for the high resolution 113 into the frame buffer 256

(S717). Thereafter, the unit 254 executes processing, such as lapping the object image over the image of any other object, and it outputs the resulting image to the video output terminal 266 to display this image by the TV set. Besides, in a case where the object is displayed after scaling up the image data for the low resolution 112 by the image processing, the unit 254 loads the image data for the low resolution 112 by referring to the start address 116 of this image data for the low resolution at the header part 111 of the image data 110 of the object (S715). Subsequently, the unit 254 scales up the image of the object by submitting the image data for the low resolution 112 to processing such as linear interpolation (S716), and it writes the scaled-up image into the frame buffer 256 (S717). Thereafter, the unit 254 executes processing, such as lapping the object image over the image of any other object, and it outputs the resulting image to the video output terminal 266 to display this image by the TV set.

The second embodiment of the present invention will be described on a case of applying the present invention to a recording medium in which a game program for a stationary game machine is stored, and to the portable game machine 250. Supposed as the case is one where the recording medium storing therein the game program developed for the stationary game machine is divertedly used in the portable game machine 250. Since the recording medium is for the stationary game machine, image data for a high resolution are basically stored therein. Also on this occasion, there are considered a case where an image is displayed by the liquid crystal display device 263 of the portable game machine 250, and a case where the image is displayed by the TV set connected outside.

To begin with, there will be explained a method wherein, as to all objects, image data are created for the resolution of the liquid crystal display device 263 of the portable game machine 250 and for the resolution of the TV set.

Figure 3:
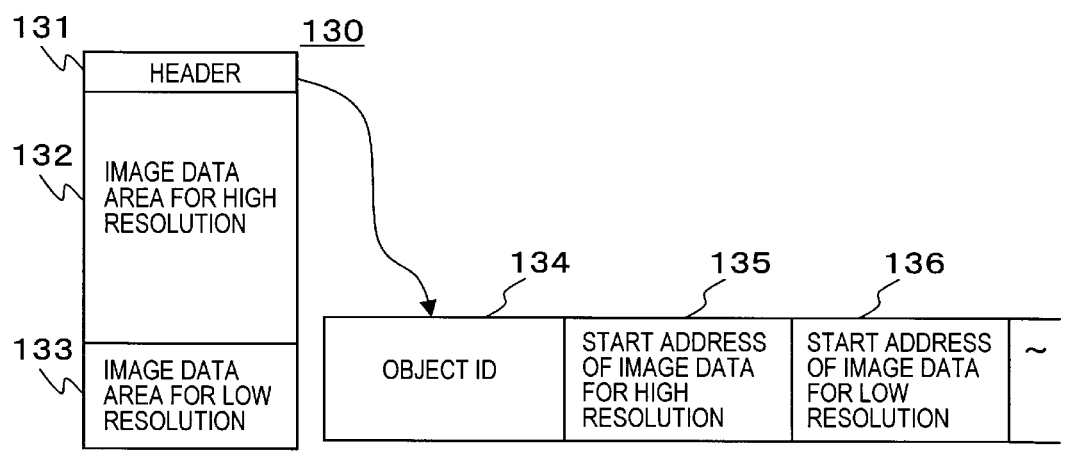
FIG. 3 is a diagram showing an image data structure for a stationary game machine in the case where image data for a low resolution and for a high resolution are created as to all objects.

FIG. 3 is a diagram schematically showing the image data structure of an object recorded in the recording medium which stores the game program therein. As shown in the figure, the image data 130 of the object has a header part 131, an image data area for a high resolution 132 and an image data area for a low resolution 133.

The header part 131 of the image data 130 of the object bears as its records an object ID 134, etc., and besides, the start address 135 of the image data for the high resolution, as well as the start address 136 of the image data for the low resolution.

The graphic processing unit 254 which has been requested to display the image of the object by the central processing unit 252 of the portable game machine 250, checks if an image display device is the liquid crystal display device 263, by referring to the image display device information written in the register.

In a case where the image display device is the liquid crystal display device 263, the graphic processing unit 254 loads the image data for the low resolution 133 by referring to the start address of the image data for the low resolution 136 at the header part 131 of the image data 130 of the object. Subsequently, the unit 254 writes the image data for the low resolution 133 into the frame buffer 256. Thereafter, the unit 254 executes processing, such as lapping the object image over the image of any other object, and it displays the resulting image on the liquid crystal display device 263.

On the other hand, in a case where the image display device is the TV set, the graphic processing unit 254 loads the image data for the high resolution 132 by referring to the start address of the image data for the high resolution 135 at the header part 131 of the image data 130 of the object. Subsequently, the unit 254 writes the image data for the high resolution 132 into the frame buffer 256. Thereafter, the unit 254 executes processing, such as lapping the object image over the image of any other object, and it outputs the resulting image to the video output terminal 266 to display this image by the TV set.

Figure 7:
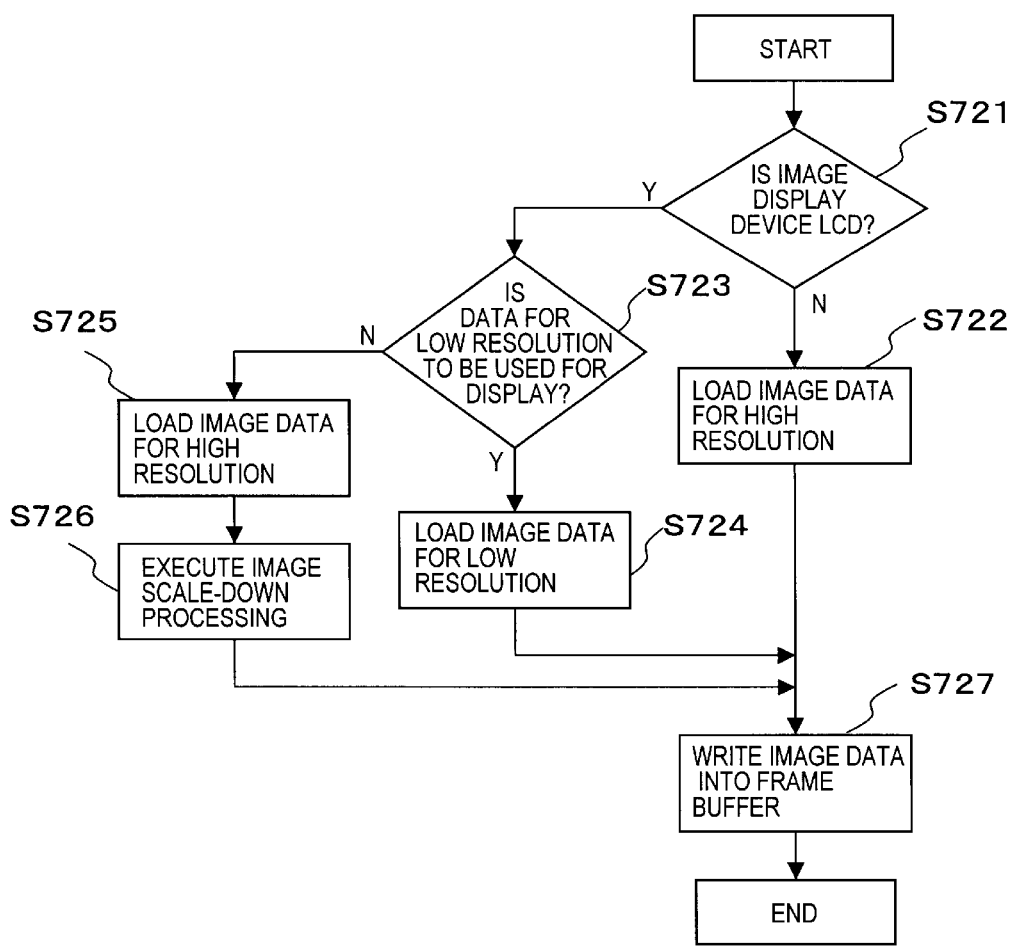
FIG. 7 is a flow chart for explaining still another example of the image processing of the portable game machine.

Next, there will be explained a method wherein information which indicates whether image data for the low resolution is created beforehand or an object image is scaled down by image processing, in case of presenting a display by the TV set, is affixed every object. FIG. 7 is a flow chart for explaining processing on this occasion.

Figure 4A:
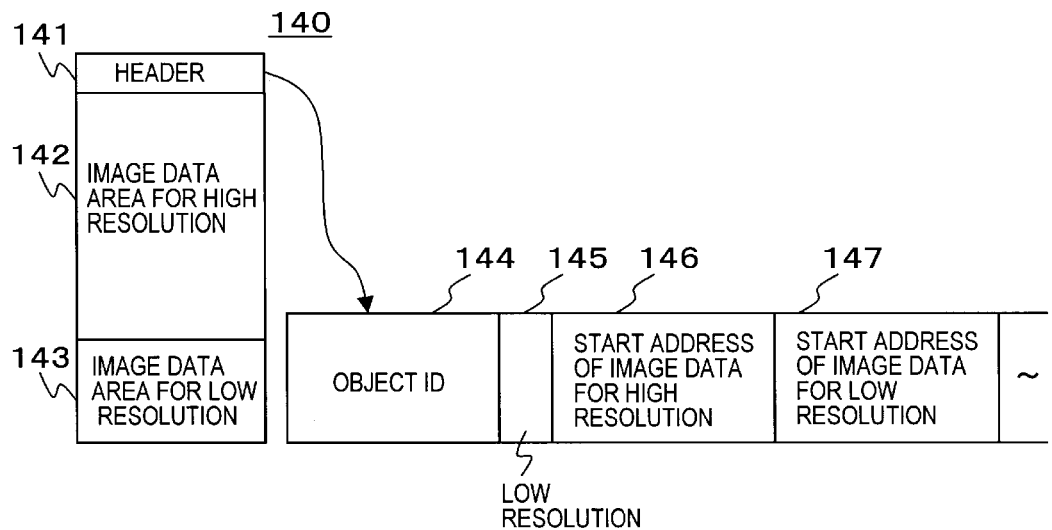
FIGS. 4A and 4B are diagrams each showing an image data structure for the stationary game machine in the case where a display method is designated every object.
Figure 4B:
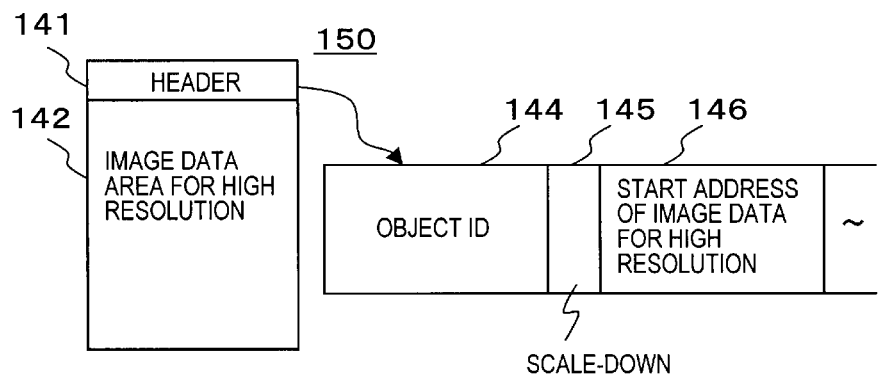

FIGS. 4A and 4B are diagrams schematically showing the image data structures of objects recorded in the recording medium which stores the game program therein, respectively. As shown in the figures, the image data of the objects are of two kinds of data 140 in FIG. 4A and 150 in FIG. 4B.

The header part 141 of the image data 140 or 150 of the object bears as its records an object ID 144, the start address 146 of image data for the high resolution adapted to the resolution of the TV set, etc., and a flag 145 for discriminating whether the image data for the low resolution is to be used or the image data for the high resolution is to be scaled down, in case of displaying the object by the liquid crystal display device 263 of the portable game machine 250. Thus, in a case (FIG. 4A) where the flag 145 indicates the object which is displayed using the image data for the low resolution 143, the start address 147 of this image data for the low resolution is recorded in the header part 141. On the other hand, in a case (FIG. 4B) where the flag 145 indicates the object which is displayed by scaling down the image data for the high resolution 142, the above start address 147 is not recorded in the header part 141.

The image data area for the high resolution 142 is provided behind the header part 141 of each of the image data 140 and 150 of the object. In the case where the flag 145 indicates the object which is displayed using the image data for the low resolution, the image data 140 is further provided with the image data area for the low resolution 143. On the other hand, in the case where the flag 145 indicates the object which is displayed by scaling down the image data for the high resolution, the above area 143 is not provided. Therefore, the quantity of image data can be decreased.

According to this method, it is desirable to create the high resolution image data for the object which is alphanumeric information, a character or the like, and to endow a background or the like with the data format in which the low resolution image data is scaled up for the display by the image processing.

The graphic processing unit 254 which has been requested to display the image of the object by the central processing unit 252 of the portable game machine 250, checks if an image display device is the liquid crystal display device 263, by referring to the image display device information written in the register (S721).

In a case where the image display device is the TV set, the graphic processing unit 254 loads the image data for the high resolution 142 by referring to the start address of the image data for the high resolution 146 at the header part 141 of the image data 140 or 150 of the object (S722). Subsequently, the unit 254 writes the image data for the high resolution 142 into the frame buffer 256 (S727). Thereafter, the unit 254 executes processing, such as lapping the object image over the image of any other object, and it outputs the resulting image to the video output terminal 266 to display this image by the TV set.

On the other hand, in a case where the image display device is the liquid crystal display device 263, the graphic processing unit 254 acquires information which indicates whether the image data for the low resolution 143 is to be used for the display or the image data for the high resolution 142 is to be scaled down for the display by the image processing, by referring to the flag 145 of the header part 141 of the image data 140 or 150 of the object (S723). In a case where the object is displayed using the image data for the low resolution 143, the unit 254 loads the image data for the low resolution 143 by referring to the start address 147 of this image data for the low resolution at the header part 141 of the image data 140 of the object (S724). Subsequently, the unit 254 writes the image data for the low resolution 143 into the frame buffer 256 (S727). Thereafter, the unit 254 executes processing, such as lapping the object image over the image of any other object, and it displays the resulting image on the liquid crystal display device 263. Besides, in a case where the object is displayed after scaling down the image data for the high resolution 142 by the image processing, the unit 254 loads the image data for the high resolution 142 by referring to the start address 146 of this image data for the high resolution at the header part 141 of the image data 150 of the object (S725). Subsequently, the unit 254 scales down the image of the object by submitting the image data for the high resolution 142 to processing such as of a low-pass filtering (S726), and it writes the scaled-down image into the frame buffer 256 (S727). Thereafter, the unit 254 executes processing, such as lapping the object image over the image of any other object, and it displays the resulting image on the liquid crystal display device 263.

The third embodiment of the present invention will be described on a case of applying the invention to a recording medium in which a game program for a portable game machine is stored, and to the stationary game machine 310. Supposed as the case is one where the recording medium storing therein the game program developed for the portable game machine is divertedly used in the stationary game machine 310. Since the recording medium is for the portable game machine, image data for a low resolution are basically stored therein. Besides, the TV set 340 is connected as an image display device to the stationary game machine 310.

To begin with, there will be explained a method wherein, as to all objects, image data are created for the resolution of the liquid crystal display device and for the resolution of the TV set.

The image data structure of an object which is recorded in the recording medium storing the game program therein, is the same as those in the first embodiment shown in FIG. 1.

The graphic processing unit 62 which has been requested to display the image of the object by the central processing unit 51 of the stationary game machine 310, loads the image data for the high resolution 103 by referring to the start address of the image data for the high resolution 106 at the header part 101 of the image data 100 of the object. Subsequently, the unit 62 writes the image data for the high resolution 103 into the frame buffer 63. Thereafter, the unit 254 executes processing, such as lapping the object image over the image of any other object, and it displays the resulting image by the TV set 340.

Figure 8:
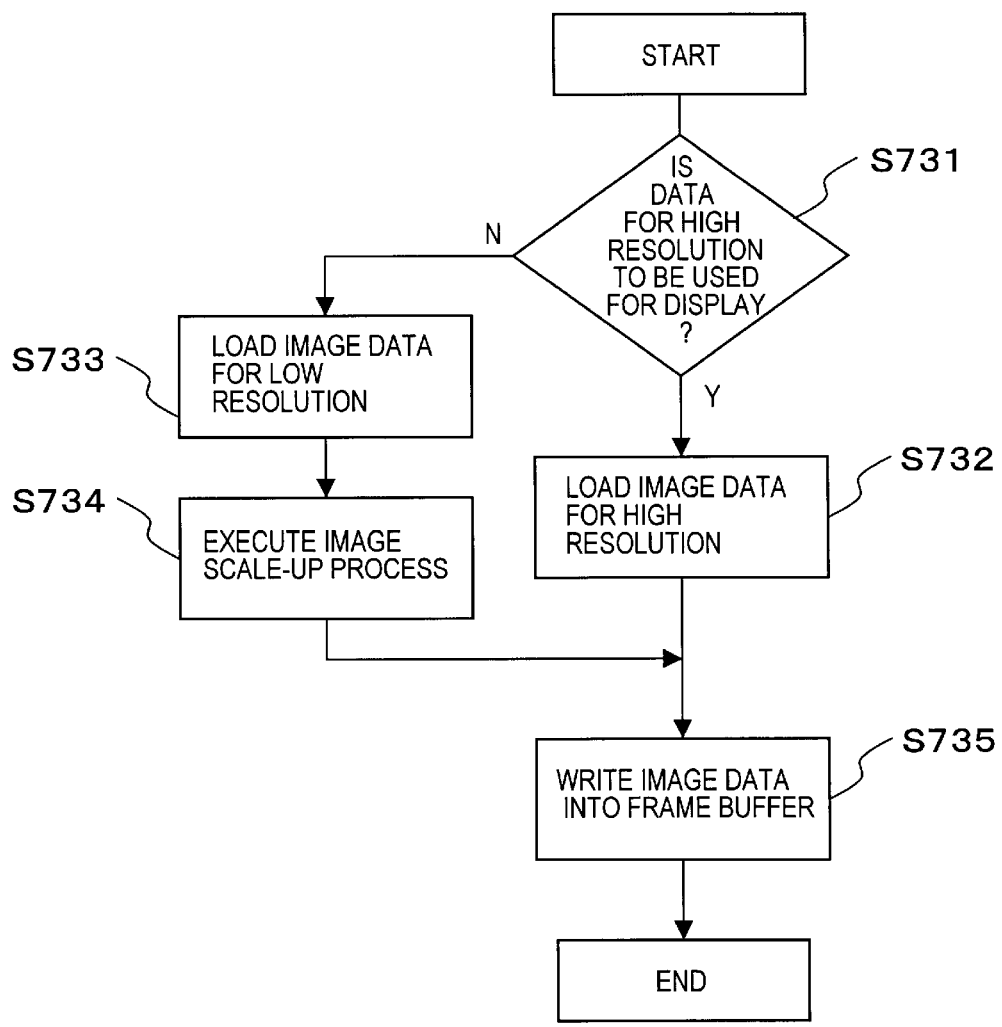
FIG. 8 is a flow chart for explaining an example of the image processing of the stationary game machine.
Figure 9A:
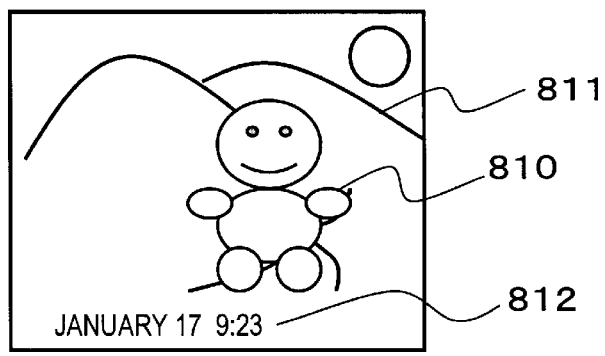
FIGS. 9A and 9B are diagrams for explaining the overlap of object images.
Figure 9B:
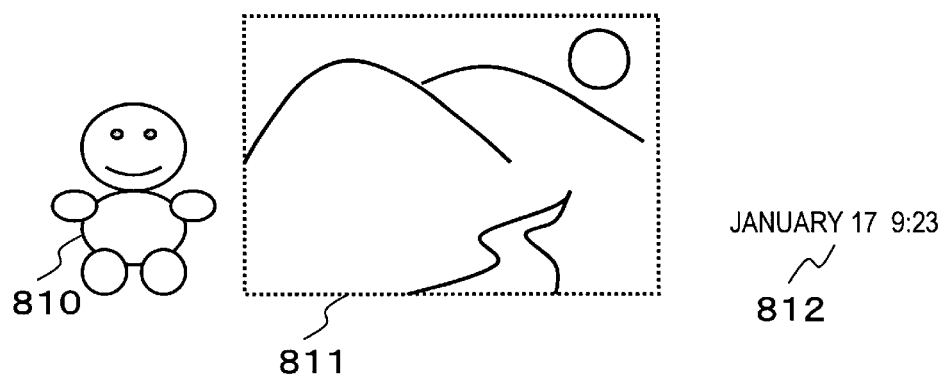

Next, there will be explained a method wherein information which indicates whether image data for the high resolution is used or an object image is scaled up by image processing, is affixed every object. FIG. 8 is a flow chart for explaining processing on this occasion.

The image data structure of objects which is recorded in the recording medium storing the game program therein, is the same as that in the first embodiment shown in FIGS. 2A and 2B.

The graphic processing unit 62 which has been requested to display the image of the object by the central processing unit 51 acquires information which indicates whether the image data for the high resolution 113 is to be used for the display or the image data for the low resolution 112 is to be scaled up for the display by the image processing, by referring to the flag 115 of the header part 111 of the image data 110 or 120 of the object (S731). In a case where the object is displayed using the image data for the high resolution 113, the unit 62 loads the image data for the high resolution 113 by referring to the start address 117 of this image data for the high resolution at the header part 111 of the image data 110 of the object (S732). Subsequently, the unit 62 writes the image data for the high resolution 113 into the frame buffer 63 (S735). Thereafter, the unit 62 executes processing, such as lapping the object image over the image of any other object, and it displays the resulting image by the TV set 340. Besides, in a case where the object is displayed after scaling up the image data for the low resolution 112 by the image processing, the unit 62 loads the image data for the low resolution 112 by referring to the start address 116 of this image data for the low resolution at the header part 111 of the image data 110 of the object (S733). Subsequently, the unit 62 scales up the image of the object by submitting the image data for the low resolution 112 to processing such as linear interpolation (S734), and it writes the scaled-up image into the frame buffer 63 (S735). Thereafter, the unit 62 executes processing, such as lapping the object image over the image of any other object, and it displays the resulting image by the TV set 340.

A program for causing the portable game machine 250 or the stationary game machine 310 to execute the processing in each embodiment can be contained in the game program which is stored in the recording medium. Alternatively, it may well be written in, for example, the nonvolatile memory (not shown) of the portable game machine 250 or the like beforehand.

As described above, according to the present invention, objects which appear in a game can be displayed using image data suited to the image display device.

What is claimed is:

1. A recording medium readable by an information processor, the recording medium being recorded with information, the information comprising:

a game program for causing the information processor to execute a game; and data to be referred to by the game program;

the data including:

first stored image data for displaying objects appearing in the game at a first resolution; and second stored image data for displaying objects appearing in the game a second resolution;

the game program causing the information processor to execute processing including:

discriminating an image display device to which the information processor outputs display data; and specifying image data of an object to be displayed from among the first stored image data and the second stored image data based on the discriminated image display device.

2. A recording medium readable by an information processor, the recording medium being recorded with data to be referred to by a game program, the data comprising:

first image data and second image data for displaying objects appearing in the game, the first image data having been created in advance for a plurality of resolutions, and the second image data having been created in advance for a single resolution;

the game program causing the information processor to execute processing including:

discriminating an image display device to which the information processor outputs display data;

determining whether image data of an object to be displayed is part of the first image data or the second image data;

if the image data of the object to be displayed is part of the first image data, specifying the image data for displaying the object from the first image data based on the discriminated image display device;

if the image data of the object to be displayed is the second image data, determining whether the image data of the object to be displayed is for a resolution conforming to the discriminated image display device; and scaling the image data of the object to be displayed up or down if the resolution does not conform to the discriminated image display device.

3. An information processor for playing a game, the information processor comprising:

storage means for storing first image data for displaying objects appearing in the game at a first resolution and second image data for displaying objects appearing in the game at a second resolution;

means for discriminating an image display device which displays an image; and means for specifying image data of an object to be displayed from among the first stored image data and the second stored image data based on the discriminated image display device.

4. An information processor for playing a game, the information processor comprising:

storage means for storing first image data and second image data for displaying objects appearing in the game, the first image data having been created in advance for a plurality of resolutions, and the second image data having been created in advance for a single resolution;

means for discriminating an image display device which displays an image;

means for determining whether image data of an object to be displayed is part of the first image data or the second image data;

means for specifying the image data for displaying the object from the first image data based on the discriminated image display device when the image data of the object to be displayed is part of the first image data;

means for determining whether the image data of the object to be displayed is for a resolution conforming to the discriminated image display device when the image data of the object to be displayed is the second image data; and means for scaling the image data of the object to be displayed up or down when the resolution does not conform to the discriminated image display device.

5. An information processor as claimed in claim 4, further comprising:

a built-in image display device, wherein the information processor is connectable to an external image display device; and the means for discriminating the image display device further discriminates whether the image display device is the built-in image display device or an external image display device connected to the information processor.

6. A system for executing a game, comprising:

a processor operable to execute instructions; and instructions, the instructions including:

referring to first stored image data for displaying objects appearing in the game at a first resolution;

referring to second stored image data for displaying objects appearing in the game at a second resolution;

discriminating an image display device to which the processor outputs display data; and specifying image data of an object to be displayed from among the first stored image data and the second stored image data based on the discriminated image display device.

7. A system for executing a game, comprising:

a processor operable to execute instructions; and instructions, the instructions including:

referring to first image data and second image data for displaying objects appearing in the game, the first image data having been created in advance for a plurality of resolutions, and the second image data having been created in advance for a single resolution;

discriminating an image display device to which the processor outputs display data;

determining whether image data of an object to be displayed is part of the first image data or the second image data;

if the image data of the object to be displayed is part of the first image data, specifying the image data for displaying the object from the first image data based on the discriminated image display device;

if the image data of the object to be displayed is the second image data, determining whether the image data of the object to be displayed is for a resolution conforming to the discriminated image display device; and scaling the image data of the object to be displayed up or down if the resolution does not conform to the discriminated image display device.

8. A recording medium readable by an information processor, the recording medium being recorded with information, the information comprising:

a game program executable by the information processor; and data to be referred to by the game program;

the data including:

first stored image data for displaying objects appearing in a game at a first resolution, and second stored image data for displaying the objects appearing in the game at a second resolution, wherein the game program is executable by the information processor to specify image data for displaying the objects in the game from among the first stored image data and the second stored image data based on a resolution of the image display device to which the information processor is connected to output the image data.

9. A recording medium readable by an information processor, the recording medium being recorded with data to be referred to by a game program, the data comprising:

first image data and second image data for displaying objects appearing in the game, the first image data having been created in advance for a plurality of resolutions, and the second image data having been created in advance for a single resolution;

wherein the game program is executable by the information processor to specify image data for displaying an object from the first image data at a particular one of the plurality of resolutions based on a resolution of the image display device to which the information processor is connected when the image data of the object to be displayed is part of the first image data, and to cause the information processor to scale the image data of the object to be displayed up or down when the object to be displayed is part of the second image data and the resolution of the second image data does not conform to the image display device.

10. An information processor, comprising:

means for referring to a recording medium on which first image data and second image data are stored, the first image data for displaying objects appearing in a game at a first resolution, and the second image data for displaying objects appearing in the game at a second resolution;

means for discriminating an image display device connected to the information processor for displaying the objects; and means for specifying image data of an object to be displayed from among the first stored image data and the second stored image data based on the discriminated image display device.

11. An information processor, comprising:

means for referring to a recording medium on which first image data and second image data are stored, the first image data for displaying objects appearing in a game at a first resolution, and the second image data for displaying objects appearing in the game at a second resolution; and means for specifying image data of an object to be displayed from among the first stored image data and the second stored image data based on an image display device to which the information processor is connected.

12. An information processor, comprising:

means for referring to data including first image data and second image data for displaying objects appearing in a game, the first image data having been created in advance for a plurality of resolutions, and the second image data having been created in advance for a single resolution;

means for discriminating an image display device connected to the information processor for displaying the objects;

means for specifying image data of an object to be displayed from the first image data at a particular one of the resolutions based on a resolution of the discriminated image display device when the image data of the object to be displayed is part of the first image data, and means for scaling the image data of the object to be displayed up or down when the image data of the object to be displayed is part of the second image data and the resolution of the second image data does not conform to the discriminated image display device.

13. An information processor, comprising:

means for referring to data including first image data and second image data for displaying objects appearing in a game, the first image data having been created in advance for a plurality of resolutions, and the second image data having been created in advance for a single resolution;

means for specifying image data of an object to be displayed from the first image data at a particular one of the resolutions based on a resolution of an image display device when the image data of the object to be displayed is part of the first image data, and means for scaling the image data of the object to be displayed up or down when the image data of the object to be displayed is part of the second image data and the resolution of the second image data does not conform to the image display device.

14. A information processor having a built-in image display device and being connectable to an external image display device, comprising:

storage means for storing image data for displaying objects appearing in a game, the image data having been created in advance for a plurality of resolutions, means for discriminating whether an image display device for displaying the objects is the built-in image display device or an external image display device connected to the information processor; and means for specifying image data of an object to be displayed from the image data at one of the plurality of resolutions based on the discriminated image display device.

* * * * *

UNITED STATES PATENT AND TRADEMARK OFFICE
CERTIFICATE OF CORRECTION

PATENT NO. : 6,778,711 B2
DATED : August 17, 2004
INVENTOR(S) : Toru Morita

It is certified that error appears in the above-identified patent and that said Letters Patent is hereby corrected as shown below:

Column 1,
Line 22, "of ten" should read -- often --.

Column 12,
Line 53, after "game" insert -- at --.

Signed and Sealed this

Fifteenth Day of February, 2005

JON W. DUDAS
*Director of the United States Patent and Trademark Office*